(12) United States Patent
Nguyen et al.

(10) Patent No.: US 9,780,640 B2
(45) Date of Patent: Oct. 3, 2017

(54) MULTI-PHASE VOLTAGE CONVERTER WITH FAULT INSTRUCTION CIRCUIT

(71) Applicant: Monolithic Power Systems, Inc., San Jose, CA (US)

(72) Inventors: James Nguyen, San Jose, CA (US); Rohan Samsi, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 14/970,532

(22) Filed: Dec. 15, 2015

(65) Prior Publication Data

US 2017/0170714 A1    Jun. 15, 2017

(51) Int. Cl.
*H02M 1/32* (2007.01)
*H02M 3/158* (2006.01)
*H02M 3/157* (2006.01)

(52) U.S. Cl.
CPC ........... *H02M 1/32* (2013.01); *H02M 3/1584* (2013.01); *H02M 3/157* (2013.01)

(58) Field of Classification Search
CPC .. H02M 1/32; H02M 2001/325; H02M 3/157; H02M 3/158; H02M 3/1584; H02M 2003/1586
See application file for complete search history.

(56) References Cited

U.S. PATENT DOCUMENTS

| | | | | |
|---|---|---|---|---|
| 8,084,884 B1* | 12/2011 | Lakshmikanthan | | H02M 3/1584 307/52 |
| 9,385,608 B1* | 7/2016 | Chakraborty | ....... | H02M 3/1584 |
| 2004/0075600 A1* | 4/2004 | Vera | ........ | H02J 1/102 341/166 |
| 2005/0276081 A1* | 12/2005 | Bemat | ......... | H02H 7/1213 363/65 |
| 2007/0013361 A1* | 1/2007 | Burlak | ......... | H02M 1/32 324/142 |
| 2011/0101940 A1* | 5/2011 | Kudo | ........ | H02M 3/1584 323/282 |
| 2012/0086416 A1* | 4/2012 | Kudo | ........ | H02M 3/1584 323/265 |
| 2014/0132233 A1* | 5/2014 | Park | ........ | H02H 7/1213 323/272 |
| 2014/0268939 A1* | 9/2014 | Tomas | ........ | H02M 1/32 363/50 |
| 2016/0182039 A1* | 6/2016 | Xiao | ........ | H03K 17/18 307/115 |
| 2016/0268892 A1* | 9/2016 | Gupta | ........ | H02M 3/07 |
| 2016/0315538 A1* | 10/2016 | Nguyen | ........ | H02M 3/1584 |

* cited by examiner

*Primary Examiner* — Fred E Finch, III
(74) *Attorney, Agent, or Firm* — Perkins Coie LLP

(57) ABSTRACT

A switching circuit with a fault instruction circuit used in a voltage converter or a multi-phase voltage converter. The switching circuit has a pin, the pin is configured to receive a control signal during a normal operation, and the pin is also configured to output a fault instruction signal when one or more faults occur in the switching circuit. The instruction signal represents each of the one or more faults with a particular value.

20 Claims, 11 Drawing Sheets

| status (VCC=3.3V) | R1 | R2 | R3 | R4 | SW1 | SW2 | SW3 | SW4 | fault_C (voltage) |
|---|---|---|---|---|---|---|---|---|---|
| normal | 5k | 10k | 15K | 25K | off | off | off | off | PWM |
| over current | 5k | 10k | 15K | 25K | on | on | off | off | 2.2V |
| over voltage | 5k | 10k | 15K | 25K | off | on | on | off | 1.32V |
| over temperature | 5k | 10k | 15K | 25K | off | off | on | on | 2.19 |
| short to GND | 5k | 10k | 15K | 20k | on | off | off | on | 2.92 |
| over current & over voltage | 5k | 10k | 15K | 20k | on | on | on | off | 0.73V |
| over voltage & over temperature | 5k | 10k | 15K | 20k | off | on | on | on | 0.32V |

Fig. 7

MULTI-PHASE VOLTAGE CONVERTER WITH FAULT INSTRUCTION CIRCUIT

TECHNICAL FIELD

The present invention generally relates to electronic circuits, and more particularly but not exclusively to multi-phase voltage converter and switching circuit with fault instruction circuit.

BACKGROUND

In power solutions of high integrated applications, an integrated switching circuit is widely used with fewer pins. Generally, as shown in FIG. 1, a switching circuit 51 may comprise four pins, a first pin 501 configured to output a fault disable signal, a second pin 502 configured to receive a control signal PWM to control the switching circuit 51, a third pin 503 configured to receive an input voltage signal $V_{IN}$, and a fourth pin 504 configured to provide an output voltage signal $V_{OUT}$. Usually, the fault disable signal may be used to indicate whether one or more faults occur. The switching circuit 51 will be turned off for protection once one or more faults occur in the switching circuit 51.

However, detailed fault information may not be obtained from the fault disable signal. Moreover, in multi-phase voltage converters, any fault in one phase of the switching circuits may induce the whole multi-phase voltage converter to shut down. Still, the fault disable signal is not able to provide specific information regarding what types of the one or more faults are and which phase the one or more faults occur in. Traditionally, if we need more fault information about the switching circuit 51, additional pins may be added, which can result in larger size, and higher cost of the integrated circuit.

SUMMARY

Embodiments of the present invention are directed to a switching circuit with a fault detection function. The switching circuit comprising a first pin and a second pin. The first pin is configured to provide a disable signal, wherein the switching circuit is turned off once the disable signal is in an active state, and wherein the disable signal is in the active state when one or more faults occur in the switching circuit. When the disable signal is in an inactive state, the second pin is configured to receive a control signal to control the switching circuit; and when the disable signal is in the active state, the second pin is configured to output an instruction signal, wherein the instruction signal is configured to represent each of the one or more faults with a particular value.

Embodiments of the present invention are further directed to a multi-phase voltage converter with a fault detection function. The multi-phase voltage converter comprises a plurality of switching circuits and a controller. The plurality of switching circuits with each of the switching circuits comprising a first pin and a second pin, wherein the first pin is configured to provide a disable signal, wherein the disable signal is in an active state when one or more faults occur in the switching circuit. when the disable signal is in an inactive state, the second pin is configured to receive a control signal to control the switching circuit; and when the disable signal is in the active state, the second pin is configured to output an instruction signal, wherein the instruction signal is configured to represent each of the one or more faults with a particular value. The controller configured to receive a feedback signal indicative of an output voltage of the multi-phase voltage converter, and further configured to generate the control signal of each of the plurality of switching circuits based on the feedback signal, wherein the controller is also configured to receive the disable signal of each of the plurality of switching circuits. when the disable signal of each of the plurality of switching circuits is in the inactive state, the controller is configured to provide the control signal to the second pin of each of the plurality of switching circuits; when the disable signal of one of the plurality of switching circuits is in the active state, the controller is configured to turn the plurality of switching circuits off, and further configured to receive the instruction signal from the second pin of the corresponding switching circuit.

Embodiments of the present invention are further directed to a fault detection method used in a switching circuit, wherein the switching circuit has a first pin and a second pin, and wherein during normal operation, the second pin is configured to receive a control signal to control the switching circuit. The fault detection method comprising: detecting whether one or more faults occur in the switching circuit; providing a disable signal at the first pin, wherein the disable signal is configured to turn the switching circuit off once one or more faults occur; providing an instruction signal at the second pin based on the one or more faults, wherein the instruction signal is configured to represent each of the one or more faults with a particular value; and outputting a fault report signal based on the instruction signal.

BRIEF DESCRIPTION OF THE DRAWING

The present invention can be further understood with reference to the following detailed description and the appended drawings, wherein like elements are provided with like reference numerals.

FIG. 7 shows a table illustrated the voltage of the fault instruction signal of FIG. 6 in accordance with an embodiment of the present invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Embodiments of the present invention are directed to a multi-phase switching converter comprising a plurality of switching circuits. During normal operation, all of the switching circuits are turned on successively. When an over current condition of a current switching circuit of the plurality of switching circuits is detected, instead of shutting down the whole multi-phase switching converter, the current switching circuit is skipped and the other switching circuits are turned on successively. In this specification, multi-phase switching converters with constant on-time control are set as examples to describe the embodiments. However, persons skilled in the art can recognize that the present invention can also be applied to multi-phase switching converters with any other control method.

Figure 1:
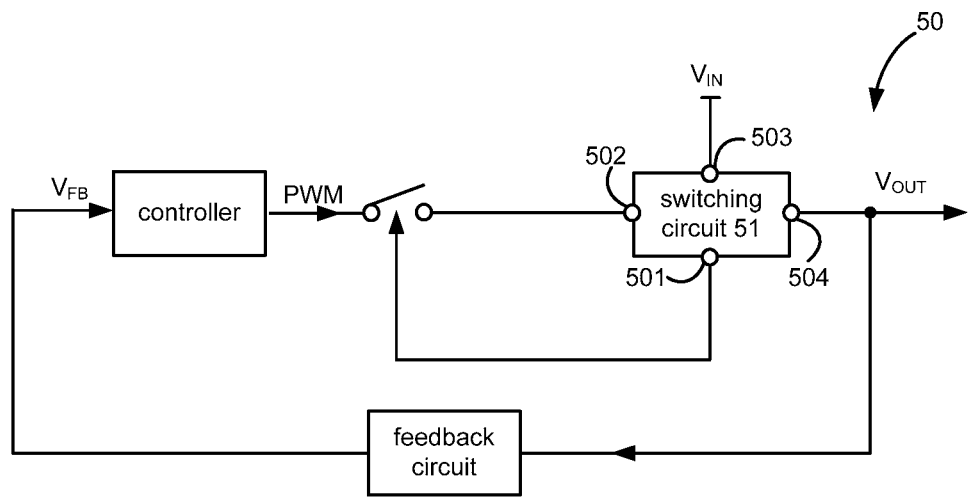
FIG. 1 illustrates a prior art block diagram of a voltage converter 50.
Figure 2:
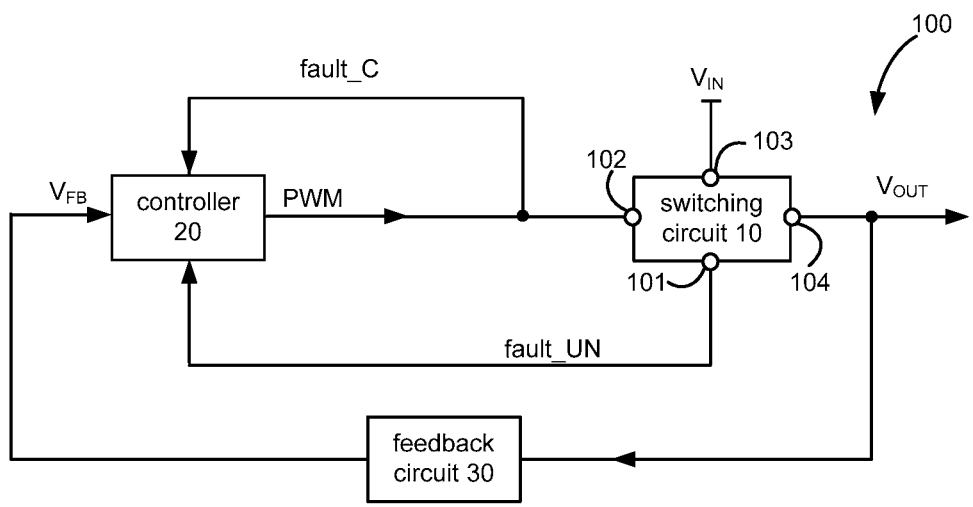
FIG. 2 illustrates a block diagram of a voltage converter 100 in accordance with one embodiment of the present invention.

FIG. 2 illustrates a block diagram of a voltage converter 100 in accordance with an embodiment of the present invention. As shown in FIG. 2, the voltage converter 100 may comprise a switching circuit 10, a controller 20 and a feedback circuit 30.

In one embodiment, the switching circuit 10 may comprise a first pin 101, a second pin 102, a third pin 103 and a fourth pin 104. The first pin 101 is configured to output a fault disable signal fault_UN with an inactive state and an active state, wherein the disable signal fault_UN is in the active state when one or more faults occur in the switching circuit 10, and wherein the disable signal fault_UN is configured to turn the switching circuit 10 off once the disable signal fault_UN is in an active state. The second pin 102 may be configured to receive a control signal PWM to control the switching circuit 10 when the disable signal fault_UN is in the inactive state, and further configured to output an instruction signal fault_C when the disable signal fault_UN is in the active state, wherein the instruction signal fault_C is configured to represent each of the one or more faults with a particular value. The third pin 103 may be configured to receive an input voltage signal $V_{IN}$. The switching circuit 10 may comprise at least one switch. The input voltage $V_{IN}$ can be converted to an output voltage $V_{OUT}$ at the fourth pin 104 by switching the at least one switch on and off.

In one embodiment, the instruction signal fault_C may comprise a voltage signal. It should be understood that the instruction signal fault_C may comprise other suitable signals, e.g. current signal. In one embodiment, the instruction signal fault_C is configured to represent each of the one or more faults with a particular value. In one embodiment, for example, a voltage value 2.2V of the instruction signal fault_C is indicative of an over current fault, and a voltage value 1.32V of the instruction signal fault_C is indicative of an over voltage fault. Of course, in another embodiment, we can set a voltage value 1.8V of the instruction signal fault_C corresponding to an over current fault, and a voltage value 1.1V of the instruction signal fault_C corresponding to an over voltage fault. Moreover, when at least two faults occur at the same time, a different value of the instruction signal fault_C can be generated correspondingly. For example, in another embodiment, the voltage value 1.8V of the instruction signal fault_C corresponds to an over current fault, the voltage value 1.1V of the instruction signal fault_C corresponds to an over voltage fault, and a voltage value 0.73V of the instruction signal fault_C corresponds to an over current fault companying with an over voltage fault.

In one embodiment, the controller 20 may be configured to receive a feedback signal $V_{FB}$, and further configured to provide the control signal PWM to control the at least one switch of switching circuit 10 based on the feedback signal $V_{FB}$ when the disable signal fault_UN is in the inactive state. Moreover, the controller 20 is also configured to receive the disable signal fault_UN, and further configured to turn the switching circuit 10 off and to receive an instruction signal fault_C simultaneously when the disable signal fault_UN is in an active state.

In one embodiment, the feedback circuit 30 may be configured to receive the output voltage $V_{OUT}$ and configured to provide the feedback signal $V_{FB}$ indicative of the output voltage $V_{OUT}$.

Figure 3:
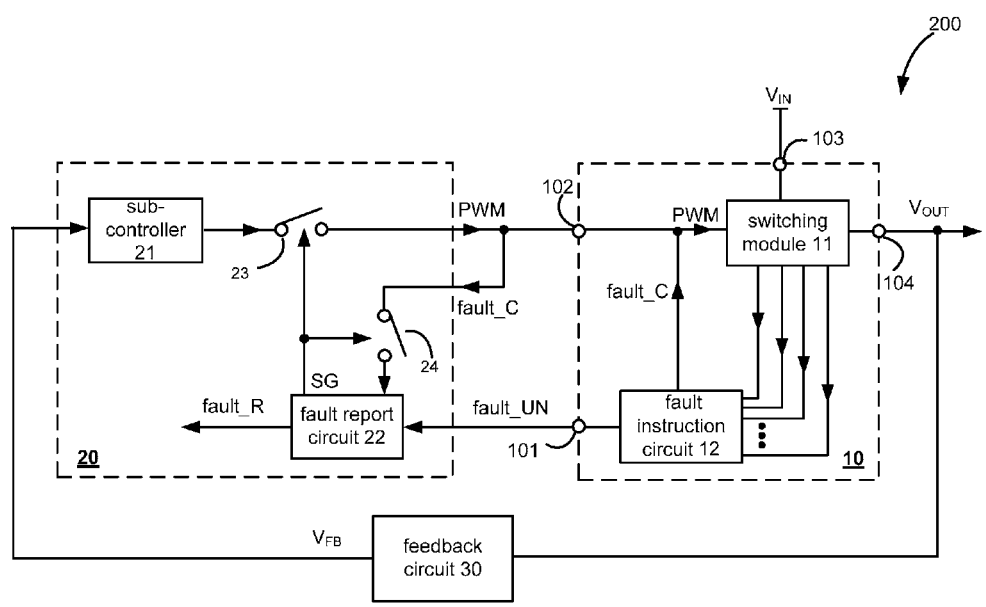
Fig. 3 illustrates a block diagram of a voltage converter 200 in accordance with an embodiment of the present invention.

FIG. 3 illustrates a block diagram of a voltage converter 200 in accordance with an embodiment of the present invention. As shown in FIG. 3, the voltage converter 200 may comprise a switching circuit 10, a controller 20 and a feedback circuit 30.

In one embodiment, the switching circuit 10 may comprise a switching module 11. In the exemplary embodiment of FIG. 3, the switching module 11 may be coupled to the second pin 102 and the third pin 103 for receiving the control signal PWM and the input voltage signal $V_{IN}$ respectively. The switching module 11 may be configured to provide the output voltage $V_{OUT}$ at the fourth pin 104, and to provide a plurality of fault state signals (F_OC, F_OV, F_OT, F_SG . . . ) indicating whether one or more faults occur in the switching circuit 10. In one embodiment, the plurality of fault state signals (F_OC, F_OV, F_OT, F_SG . . . ) may comprise an over current signal F_OC, an over voltage signal F_OV, an over temperature signal F_OT or a switch short signal F_SG. In one embodiment, each of the plurality of fault state signals (F_OC, F_OV, F_OT, F_SG . . . ) may be a logic signal having a first logic state (e.g. logic high) and a second logic state (e.g. logic low). In one embodiment, the second logic state (e.g. logic low) may indicate that one fault occurs in the switching module 11, and the first logic state (e.g. logic high) may indicate that no fault occurs.

In one embodiment, the switching circuit 10 may further comprise a fault instruction circuit 12. In the exemplary embodiment of FIG. 3, the fault instruction circuit 12 may be configured to receive the plurality of fault state signals (F_OC, F_OV, F_OT, F_SG . . . ), and coupled to the first pin 101 to provide the disable signal fault_UN. Besides, the fault instruction circuit 12 may also be coupled to the second pin 102 to provide the instruction signal fault_C when the disable signal fault_UN is in the active state.

In one embodiment, the controller 20 may comprise a sub-controller 21, a fault report circuit 22, a switch 23 and a switch 24. The sub-controller 21 may be configured to receive the feedback signal $V_{FB}$, and further configured to generate the control signal PWM, wherein the control signal PWM may be provided to the second pin 102 through the switch 23. The fault report circuit 22 may be configured to receive the disable signal fault_UN, and to receive the fault instruction signal fault_C through the switch 24. The fault report circuit 22 may be further configured to generate a control signal SG based on the disable signal fault_UN, wherein the disable signal fault_UN may be configured to control the switch 23 and the switch 24. Moreover, the fault report circuit 22 may be further configured to generate a fault report signal fault_R based on the fault instruction signal fault_C when the disable signal fault_UN is in the active state. In the exemplary embodiment of the FIG. 3, the switch 23 and the switch 24 may have complementary conduction states, e.g., the switch 23 is turned on once the switch 24 is turned off, and vice versa.

Figure 4:
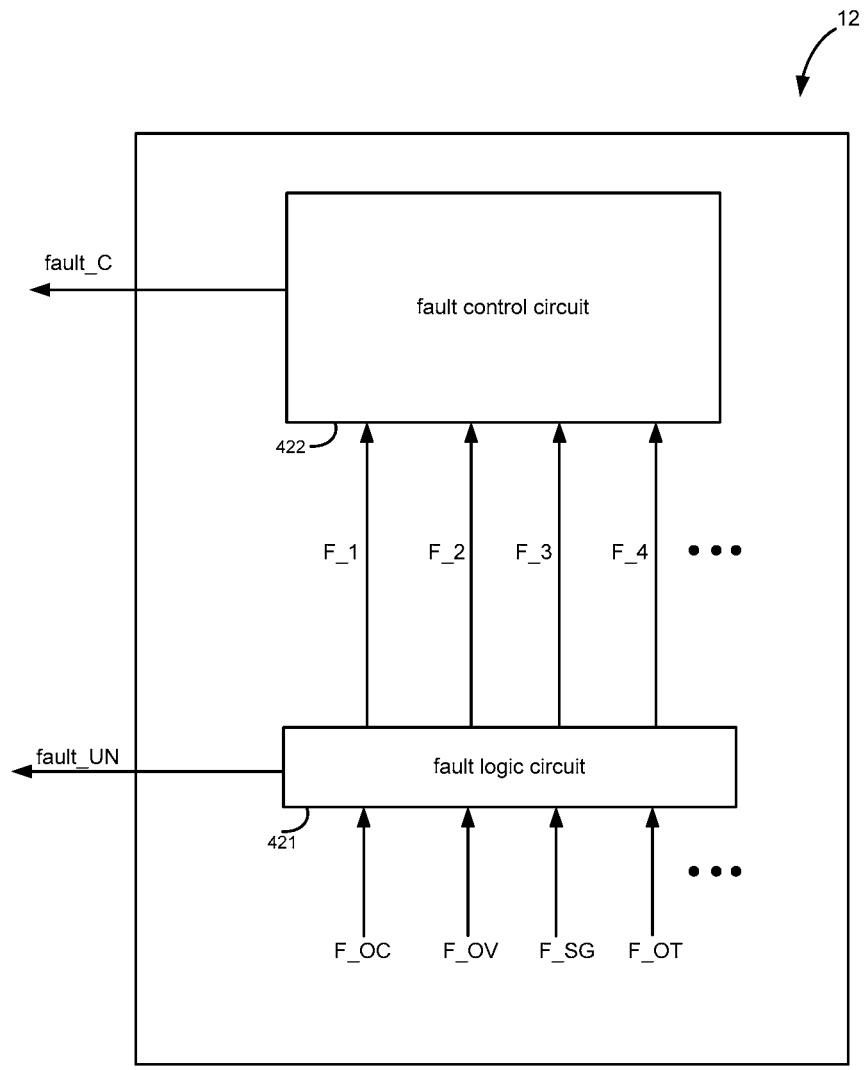
FIG. 4 illustrates a block diagram of the fault instruction circuit 12 shown in FIG. 3 in accordance with one embodiment of the present invention.

FIG. 4 illustrates a block diagram of the fault instruction circuit 12 shown in FIG. 3 in accordance with one embodiment of the present invention. As shown in the FIG. 4, the fault instruction circuit 12 may comprise a fault logic circuit 421 and a fault control circuit 422.

In one embodiment, the fault logic circuit 421 may have a plurality of input terminals, a first output terminal and a plurality of second output terminals. Each of the plurality of input terminals of the fault logic circuit 421 may be configured to receive one of the plurality of fault state signals (F_OC, F_OV, F_OT, F_SG . . . ) correspondingly. The fault logic circuit 421 may be configured to conduct a logic operation of the plurality of fault state signals (F_OC, F_OV, F_OT, F_SG . . . ) so as to provide the disable signal fault_UN at the first output terminal of the fault logic circuit 421, and to provide a plurality of switching control signals (F_1, F_2, F_3, F_4 . . . ) at the plurality of second output terminals of the fault logic circuit 421 respectively. In one embodiment, each of the plurality of switching control signals (F_1, F_2, F_3, F_4 . . . ) may be a logic signal having a first logic state (e.g. logic high) and a second logic state(e.g. logic low).

In one embodiment, the fault control circuit 422 may have a plurality of input terminals and an output terminal. Each of the plurality of input terminals of the fault control circuit 422 may be configured to receive one of the plurality of switching control signals (F_1, F_2, F_3, F_4 . . . ) correspondingly. The output terminal of the fault control circuit 422 may be configured to operate as the second pin 102. The fault control circuit 422 may be configured to provide the instruction signal fault_C at the output terminal of the fault control circuit 422 based on the plurality of switching control signals (F_1, F_2, F_3, F_4 . . . ), wherein the value of the instruction signal fault_C varies when the logic states of each of the plurality of switching control signals (F_1, F_2, F_3, F_4 . . . ) varies, and wherein the instruction signal fault_C is configured to represent each of the one or more faults with a particular value.

Figure 5A:
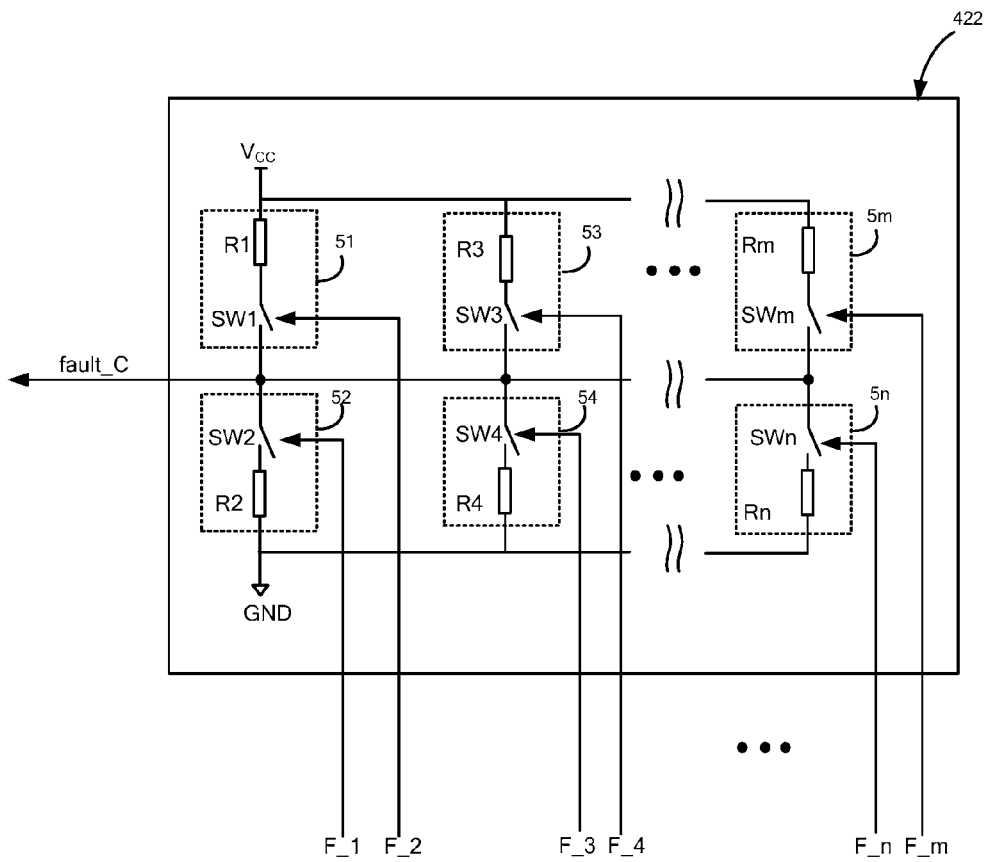
FIG. 5a schematically illustrates a fault control circuit 422 shown in FIG. 4 in accordance with an embodiment of the present invention.

FIG. 5a schematically illustrates a fault control circuit 422 shown in FIG. 4 in accordance with an embodiment of the present invention. As shown in FIG. 4, the fault control circuit 422 may comprise a first plurality of resistor modules (e.g. 51, 53 . . . , and 5m) and a second plurality of resistor modules (e.g. 52, 54 . . . , and 5n), wherein m and n are positive integers. In one embodiment, m is equal to n. In another embodiment, m is greater or smaller than n. The first plurality of resistor modules (e.g. 51, 53 . . . , and 5m) may be coupled in parallel between a supply voltage $V_{CC}$ and the second pin 102, and the second plurality of resistor modules (e.g. 52, 54 . . . , and 5n) may be connected in parallel between the second pin 102 and a logic ground GND.

In one embodiment, each of the first plurality of resistor modules (e.g. 51, 53 . . . , and 5m) and the second plurality of resistor modules (e.g. 52, 54 . . . , and 5n) may comprise a switch (e.g. SW1, SW2, SW3 . . . , SWm . . . , or SWn). Each of the switches (e.g. SW1, SW2, SW3 . . . , SWm . . . , and SWn) may comprise a control terminal configured to receive one of the plurality of switching control signals (F_1, F_2, F_3, F_4 . . . ). The value of the instruction signal fault_C at the second pin 102 varies by controlling the switches (e.g. SW1, SW2, SW3 . . . , SWm . . . , and SWn) of the first plurality of resistor modules (e.g. 51, 53 . . . , and 5m) and the second plurality of resistor modules (e.g. 52, 54 . . . , and 5n). Each particular value of the instruction signal fault_C may correspond to each of the one or more faults correspondingly.

In the exemplary embodiment of FIG. 5a, each of the first plurality of resistor modules (e.g. 51, 53 . . . , and 5m) may further comprise a resistor (e.g. R1, R3 . . . , or Rm) coupled between the supply voltage $V_{CC}$ and the second pin 102 through the switch (e.g. SW1, SW3 . . . , or SWm) correspondingly. Each of the second plurality of resistor modules (e.g. 52, 54 . . . , and 5n) may further comprise a resistor (e.g. R2, R4 . . . , or Rn) connected between the second pin 102 and the logic ground GND through the switch (e.g. SW2, SW4 . . . , or SWn) correspondingly.

In one embodiment, each of the resistors (e.g. R1, R2, R3 . . . , Rm . . . , Rn) of the first plurality of resistor modules (e.g. 51, 53 . . . , and 5m) and of the second plurality of resistor modules (e.g. 52, 54 . . . , and 5n) may have the same resistance value. In one embodiment, at least one of the resistors (e.g. R1, R3 . . . , and Rm) of the first plurality of resistor modules (e.g. 51, 53 . . . , and 5m) and the resistors (e.g. R2, R4 . . . , and Rn) of the second plurality of resistor modules (e.g. 52, 54, . . . , and 5n) may have a different resistance value from the other resistors. For example, the resistance value of R1 is different from that of R2, or the resistance value of R3 is different from that of R6.

Figure 5B:
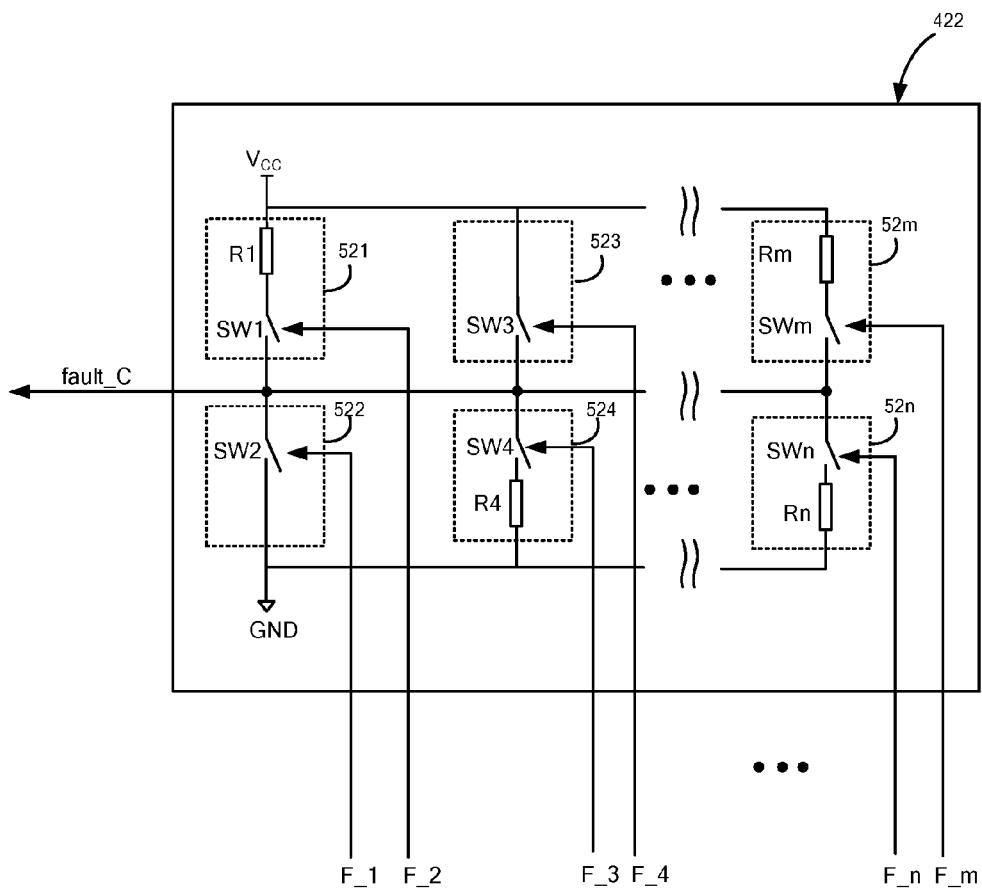
FIG. 5b schematically illustrates a fault control circuit 422 shown in FIG. 4 in accordance with an embodiment of the present invention.

FIG. 5b schematically illustrates a fault control circuit 422 shown in FIG. 4 in accordance with an embodiment of the present invention. Comparing with the exemplary embodiment of FIG. 5a, in the embodiment of FIG. 5b, at least one of the first plurality of resistor modules (e.g. 521, 523, . . . , and 52m) and the second plurality of resistor modules (e.g. 522, 524 . . . , and 52n) may further comprise a resistor), wherein m and n are positive integers. In one embodiment, m is equal to n. In another embodiment, m is greater or smaller than n. For example, in FIG. 5b, resistor module 521 may further comprise a resistor R1 coupled between the supply voltage $V_{CC}$ and the second pin 102 through a switch SW1. On the contrary, the resistor module 523 may just comprise a switch SW3 between the supply voltage $V_{CC}$ and the second pin 102. Likewise, the resistor modules 522 may just comprise a switch SW2 between the second pin 102 and the logic ground GND. It should be understood that resistor modules 522 and 523 may just used for illustrating an exemplary embodiment. Besides the resistor modules 522 and 523, other resistor modules may not comprise a resistor too.

In one embodiment, each of the resistors (e.g. R1, R2, R3 . . . , Rm . . . , and Rn) of the first plurality of resistor modules (e.g. 51, 53 . . . , and 5m) and of the second plurality of resistor modules (e.g. 52, 54 . . . , and 5n) may have the same resistance value. In one embodiment, at least one of the resistors (e.g. R1, R2, R3 . . . , Rm . . . , and Rn) may have a different resistance value from the remaining resistors. For example, the resistance value of the resistor R1 is different from that of the resistor R2, or the resistance of the resistor R3 is different from that of the resistor R5.

Figure 6:
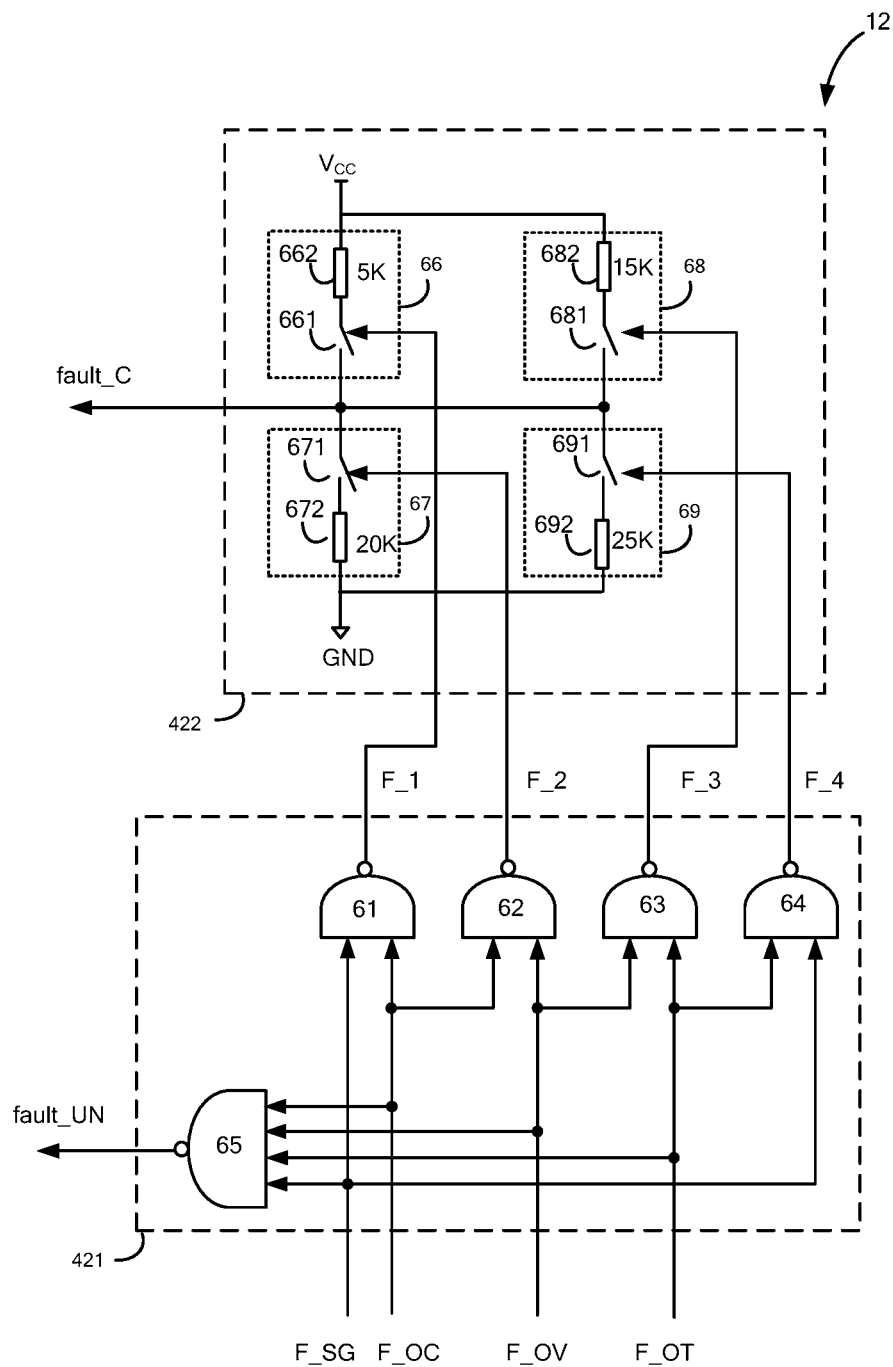
FIG. 6 schematically illustrates a fault instruction circuit 12 shown in FIG. 4 in accordance with an embodiment of the present invention.

FIG. 6 schematically illustrates a fault instruction circuit 12 shown in FIG. 4 in accordance with an embodiment of the present invention.

In the exemplary of FIG. 6, the fault logic circuit 421 may comprise a first NAND logic gate 61, a second NAND logic gate 62, a third NAND logic gate 63, a fourth NAND logic gate 64 and a fifth NAND logic gate 65. The first NAND logic gate 61 may be configured to receive the short to ground signal F_SG and the over current fault signal F_OC. The first NAND logic gate 61 may be configured to conduct an NAND logic operation to the short to ground signal F_SG and the over current fault signal F_OC, and further configured to provide an first switching control signal F_1. The second NAND logic gate 62 may be configured to receive the over current fault signal F_OC and the over voltage fault signal F_OV. The second NAND logic gate 62 may be configured to conduct an NAND logic operation to the over current fault signal F_OC and the over voltage fault signal F_OV, and further configured to provide a second switching control signal F_2. The third NAND logic gate 63 may be configured to receive the over voltage fault signal F_OV and the over temperature signal F_OT. The third NAND logic gate 63 may be configured to conduct an NAND logic operation to the over voltage fault signal F_OV and the over temperature signal F_OT, and further configured to provide a third switching control signal F_3. The fourth NAND logic gate 64 may be configured to receive the over temperature signal F_OT and the short to ground signal F_SG. The fourth NAND logic gate 64 may be configured to conduct an NAND logic operation to the over temperature signal F_OT and the short to ground signal F_SG, and further configured to provide an a fourth switching control signal F_4. The fifth NAND logic gate 65 may be configured to receive the over current fault signal F_OC, the over voltage fault signal F_OV, the over temperature signal F_OT and the short to ground signal F_SG. The fifth NAND logic gate 65 may be configured to conduct an NAND logic operation to the over current fault signal F_OC, the over voltage fault signal F_OV, the over temperature signal F_OT and the short to ground signal F_SG, and further configured to provide the disable signal fault _UN.

In the exemplary of FIG. 6, the fault control circuit 422 may comprise a first resistor module 66 with a switch 661 and a resistor 662 having a resistance value of 5K ohms, a second resistor module 67 with a switch 671 and a resistor 672 having a resistance value of 20K ohms, a third resistor module 68 with a switch 681 and a resistor 682 having a resistance value of 15K ohms, and a fourth resistor module 69 with a switch 691 and a resistor 692 having a resistance value of 25K ohms. Each of the control terminals of the switch 661, the switch 671, the switch 681 and the switch 691 may be configured to receive one of the first switching control signal F_1, the second switching control signal F_2, the third switching control signal F_3, and the fourth switching control signal F_4 correspondingly.

FIG. 7 shows a table illustrated the voltage of the fault instruction signal of FIG. 6 in accordance with an embodiment of the present invention. The table may be described in combination with the fault instruction circuit of FIG. 6. In one embodiment, the first switch 661, the second switch 671, the third switch 681 and the fourth switch 691 may be turned off when no fault occurs, and at least one of the first switch 661, the second switch 671, the third switch 681 and the fourth switch 691 may be turned on once one or more faults occur in the voltage converter. For example, when an over current fault occurs in the exemplary of FIG. 6, the over current fault signal F_OC may be activated as a logic low state. Thus, the first NAND logic gate 61 may provide the first switching control signal F_1 with a logic high state so as to turn the first switch 661 on, and the second NAND logic gate 62 may provide the second switching control signal F_2 with a logic high state so as to turn the second switch 671 on. Consequently, the voltage value of the fault instruction signal fault_C is 2.2V based on a voltage value 3.3V of the supply voltage $V_{CC}$. In other words, a voltage value 2.2V of the fault instruction signal fault_C may indicate a fault of over current occurs, and so forth.

Figure 8:
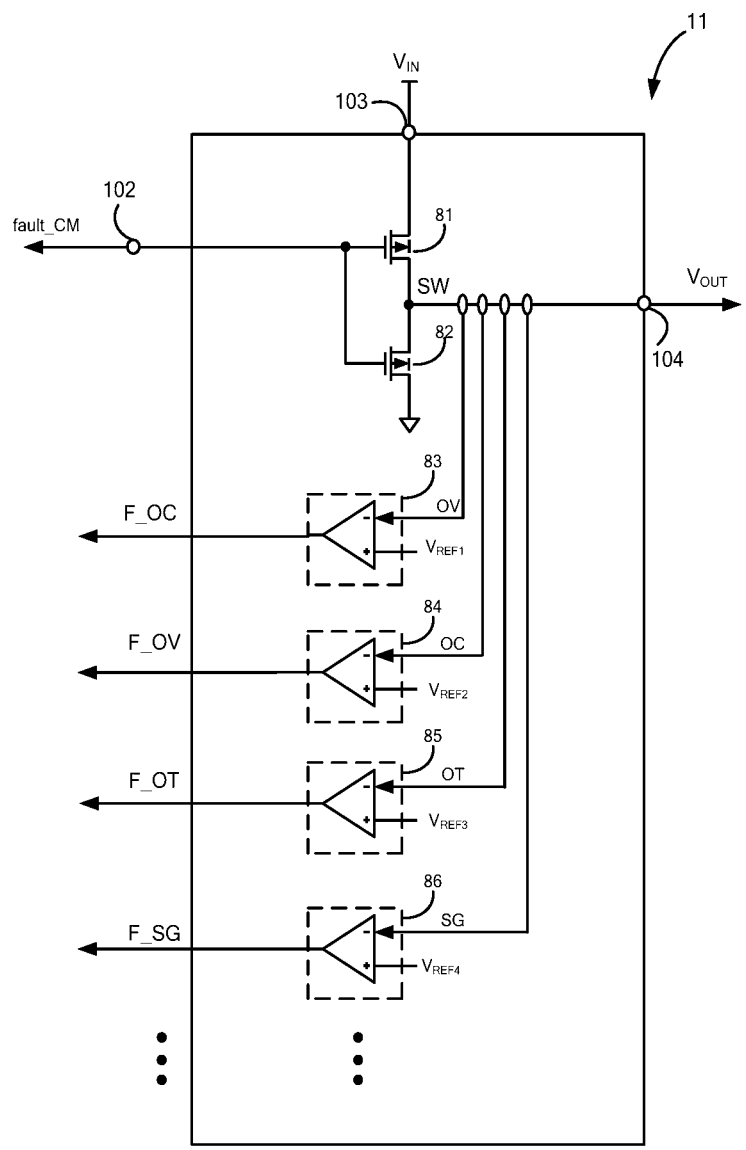
FIG. 8 schematically illustrates a switching module 11 shown in FIG. 3 in accordance with an embodiment of the present invention.

FIG. 8 schematically illustrates a switching module 11 shown in FIG. 3 in accordance with an embodiment of the present invention. As shown in FIG. 8, the switching module 11 may comprise a high side switch 81 and a low side switch 82. The high side switch 81 may be coupled to the third pin 103 to receive the input voltage signal $V_{IN}$. A common connection SW of the high side switch 81 and the low side switch 82 may be coupled to the pin 104 to provide the output voltage $V_{OUT}$. Both the gates of the high side switch 81 and of the low side switch 82 may be configured to receive the control signal PWM. The input voltage $V_{IN}$ may be converted to the output voltage $V_{OUT}$ by controlling the high side switch 81 and the low side switch 82.

In one embodiment, the switching module 11 may further comprise an over current detection circuit 83 having a first input terminal, a second input terminal and an output terminal, wherein the first input terminal of the over current detection circuit 83 may be configured to receive a current detection signal OC, and the second input terminal of the over current detection circuit 83 may be configured to receive a first reference signal $V_{REF1}$. The over current detection circuit 83 may be configured to compare the current detection signal OC with the first reference signal $V_{REF1}$ to provide the over current fault signal F_OC. In one embodiment, the over current detection circuit 83 may comprise a comparator.

In one embodiment, the switching module 11 may further comprise an over voltage detection circuit 84 having a first input terminal, a second input terminal and an output terminal, wherein the first input terminal of the over voltage detection circuit 84 may be configured to receive a voltage detection signal OV, the second input terminal of the over voltage detection circuit 84 may be configured to receive a second reference signal $V_{REF2}$. The over voltage detection circuit 84 may be configured to compare the voltage detection signal OV with the second reference signal $V_{REF2}$ to provide the over voltage fault signal F_OV. In one embodiment, the over current detection circuit 84 may comprise a comparator.

In one embodiment, the switching module 11 may further comprise an over temperature detection circuit 85 and/or a short to GND detection circuit 86 and/or other suitable fault detection circuits.

Figure 9:
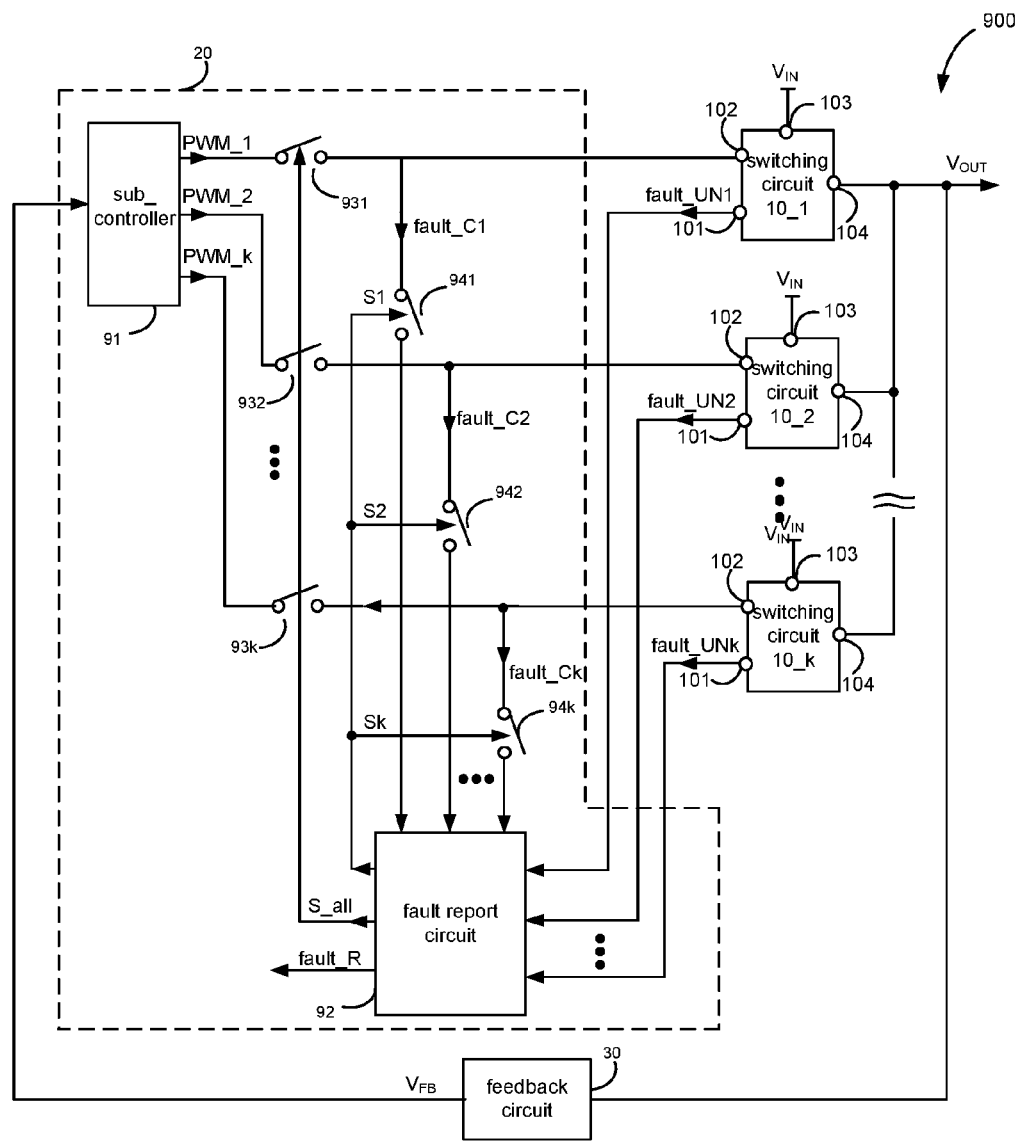
FIG. 9 schematically illustrates a multi-phase voltage converter 900 in accordance with an embodiment of the present invention.

FIG. 9 schematically illustrates a multi-phase voltage converter 900 in accordance with an embodiment of the present invention. As shown in the FIG. 9, the multi-phase voltage converter may comprise a plurality of switching circuits (10_1, 10_2 . . . , and 10_k), a controller 20 and a feedback circuit 30, wherein k is a positive integer.

As described in FIG. 2, each of the plurality of switching circuits (e.g. 10_1, 10_2 . . . , and 10_k) may comprise a first pin 101, a second pin 102, a third pin 103 and a fourth pin 104. The first pin 101 of each of the plurality of switching circuits (e.g. 10_1, 10_2 . . . , and 10_k) is configured to provide one of a plurality of fault disable signals (e.g. fault_UN1, fault_UN2 . . . , and fault_UNk) correspondingly. Each of the plurality of fault disable signals (e.g. fault_UN1, fault_UN2 . . . , and fault_UNk) may have an inactive state and an active state, wherein each of the plurality of fault disable signals (e.g. fault_UN1, fault_UN2 . . . , and fault_UNk) may be in the active state once one or more faults occur in the corresponding switching circuit. The second pin 102 of each of the plurality of switching circuits (e.g. 10_1, 10_2 . . . , and 10_k) may be configured to receive one of a plurality of control signals (e.g. PWM_1, PWM_2 . . . , and PWM_k), wherein each of the plurality of control signals (e.g. PWM_1, PWM_2 . . . , and PWM_k) may be configured to control one of the switching circuits (e.g. 10_1, 10_2 . . . , and 10_k) correspondingly. Every two successive control signals among the plurality of control signals (e.g. PWM_1, PWM_2..., and PWM_k) may have the same phase difference. For example, if k=3, the control signals PWM_1 and PWM_2 may have a 120 degrees phase difference, the control signals PWM_2 and PWM_3 may have a 120 degrees phase difference, and the control signals PWM_3 and PWM_1 may have a 120 degrees phase difference, and so forth. The second pin 102 of each of the plurality of switching circuits (e.g. 10_1, 10_2 . . . , and 10_k) may be further configured to provide one of a plurality of instruction signals (e.g. fault_C1, fault_C2 . . . , and fault_Ck) once the corresponding disable signal (e.g. fault_UN1, fault_UN2 . . . , or fault_UNk) is in the active state. In one embodiment, each of the plurality of instruction signals (e.g. fault_C1, fault_C2 . . . , and fault_Ck) may vary, wherein each of the plurality of instruction signals (e.g. fault_C1, fault_C2 . . . , and fault_Ck) may be configured to represent each of faults with a particular value in the corresponding circuit. The third pin 103 of each of the plurality of switching circuits (e.g. 10_1, 10_2 . . . , and 10_k) may be configured to receive an input voltage $V_{IN}$. The fourth pin 104 of each of the plurality of switching circuits (e.g. 10_1, 10_2 . . . , and 10_k) may be coupled together to provide an output voltage $V_{OUT}$ by a filter.

In the exemplary embodiment of FIG. 9, the controller 20 may be configured to receive a feedback signal $V_{FB}$ and the plurality of disable signals (e.g. fault_UN1, fault_UN2 . . . , and fault_UNk), wherein the feedback signal $V_{FB}$ is indicative of the output voltage $V_{out}$. The controller 20 may be configured to provide the plurality of control signals (e.g. PWM_1, PWM_2 . . . , and PWM_k) based on the feedback signal $V_{FB}$ when all of the plurality of disable signals (e.g. fault_UN1, fault_UN2 . . . , and fault_UNk) are in the inactive state. The controller 20 may be further configured to turn all of the plurality of switching circuits (e.g. 10_1, 10_2 . . . , and 10_k) off and to receive the plurality of instruction signals (e.g. fault_C1, fault_C2 . . . , and fault_Ck) once one of the plurality of disable signals (e.g. fault_UN1, fault_UN2 . . . , and fault_UNk) is in the active state.

The controller 20 may further comprise a sub-controller 91, a fault report circuit 92, a plurality of first switches (931, 932 . . . , and 93k) and a plurality of second switches (941, 942 . . . , and 94k).

The sub-controller 91 may be configured to receive the feedback signal $V_{FB}$, and further configured to generate the plurality of control signals (e.g. PWM_1, PWM_2 . . . , and PWM_k). Each of the plurality of control signals (e.g. PWM_1, PWM_2 . . . , and PWM_k) may be provided to the second pin 102 of each of the plurality of switching circuits (e.g. 10_1, 10_2 . . . , and 10_k) through the a first switch (931, 932 . . . , or 93k) correspondingly. For example, the control signal PWM_1 may be provided to the second pin 102 of the switching circuit 10_1 through a first switch 931, and so forth.

The fault report circuit 92 may be configured to receive the plurality of disable signals (fault_UN1, fault_UN2 . . . , and fault_UNk), and to receive the plurality of fault instruction signals (fault_C1, fault_C2 . . . , and fault_Ck) through the plurality of second switches (941, 942 . . . , and 94k) respectively. The fault report circuit 92 may be further configured to generate a fault report signal fault_R based on the plurality of fault instruction signals (fault_C1, fault_C2 . . . , and fault_Ck) when any one of the plurality of disable signals (fault_UN1, fault_UN2 . . . , and fault_UNk) is in the active state. Furthermore, the fault report circuit 92 may also be configured to generate a master switching control signal S_all and a plurality of switching control signals (S1, S2 . . . , and Sk) based on the plurality of disable signals (fault_UN1, fault_UN2 . . . , and fault_UNk). In one embodiment, the master switching control signal S_all may be configured to control the plurality of first switches (931, 932 . . . , and 93k) simultaneously. Each of the plurality of switching control signals (e.g. S1, S2 . . . , and Sk) may be configured to control one of the plurality of second switches (941, 942 . . . , and 94k) correspondingly. In the exemplary embodiment of the FIG. 9, when any one of the plurality of disable signals (fault_UN1, fault_UN2 . . . , fault_UNk) is in the active state, the master switching control signal S_all may be configured to turn the plurality of first switches (931, 932 . . . , and 93k) off simultaneously, and the switching control signal (e.g. S1, S2..., or Sk) for the corresponding switching circuit (e.g. 10_1, 10_2 . . . , or 10_k) having at least one fault may be configured to turn the corresponding second switch (941, 942 . . . , or 94k) on. For example, when a disable signal fault_UN1 is in the active state, the master switching control signal S_all is configured to turn the plurality of first switches (931, 932 . . . , and 93k) off simultaneously, and the switching control signal S1 is configured to turn a second switch 941 on.

In one embodiment, the fault report circuit 92 may comprise a Digital-to-Analog Converter (DAC). In one embodiment, the DAC may be configured to convert an analog voltage value of each of the fault instruction signals (fault_C1, fault_C2 . . . , and fault_Ck) to a digital value.

Figure 10:
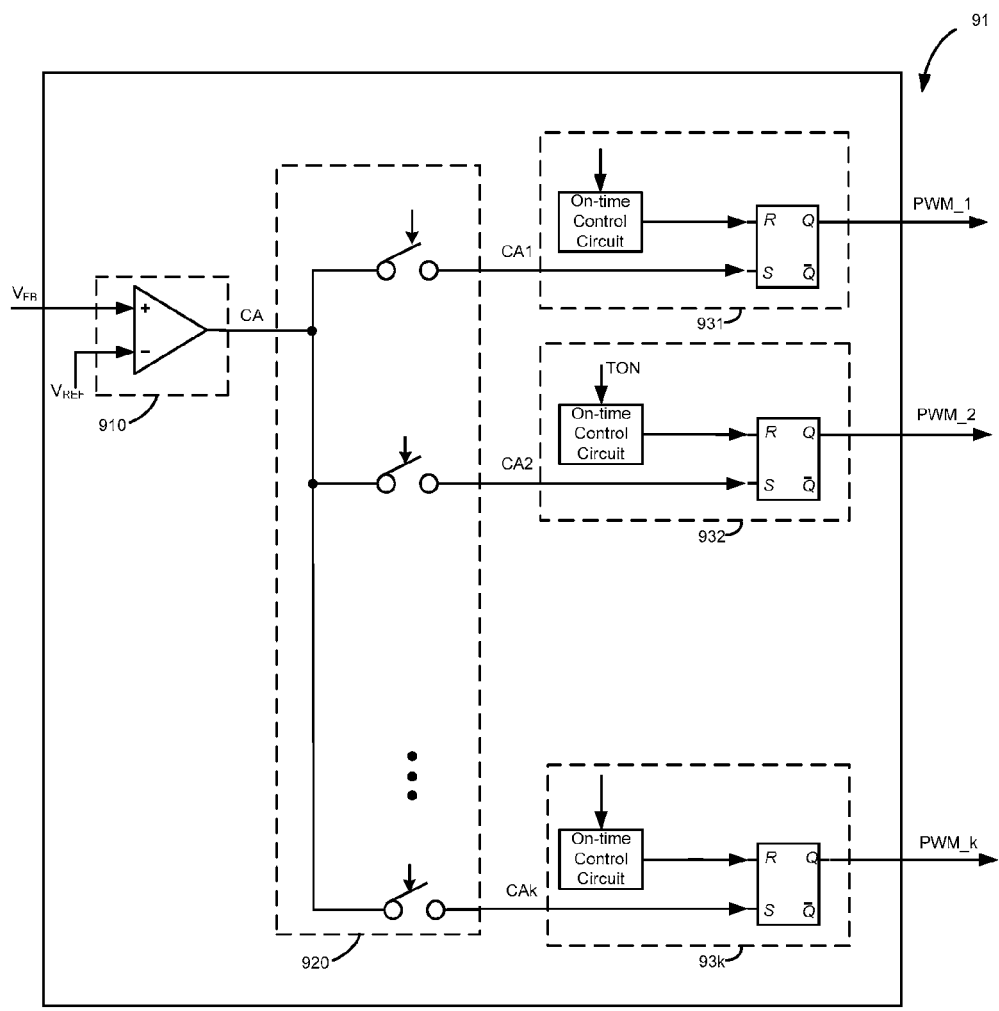
FIG. 10 schematically illustrates a sub-controller 91 shown in FIG. 9 in accordance with an embodiment of the present invention.

FIG. 10 schematically illustrates a sub-controller 91 shown in FIG. 9 in accordance with an embodiment of the present invention. In the exemplary embodiment of FIG. 10, the sub-controller 91 may comprise a comparing circuit 910, a phase shifter 920 and a plurality of constant on time control (COT) modules (e.g. 931, 932 . . . , and 93k). The comparing circuit 910 may be configured to receive the feedback signal $V_{FB}$, and further configured to compare the feedback signal $V_{FB}$ with a reference signal $V_{REF}$ for generating a comparing signal CA. The phase shifter 920 may be configured to receive the comparing signal CA, and further configured to provide a plurality of shifting signals (e.g.CA1, CA2 . . . , and CAk). Each of the plurality of COT modules (e.g. 931, 932 . . . , and 93k) may be configured to receive one of the plurality of shifting signals (e.g.CA1, CA2 . . . , and CAk), and further configured to provide one of the plurality of control signals (e.g. PWM_1, PWM_2 . . . , and PWM_k) correspondingly. In another embodiment, the sub-controller 91 may comprise other suitable control circuit for realizing the same functions.

Figure 11:
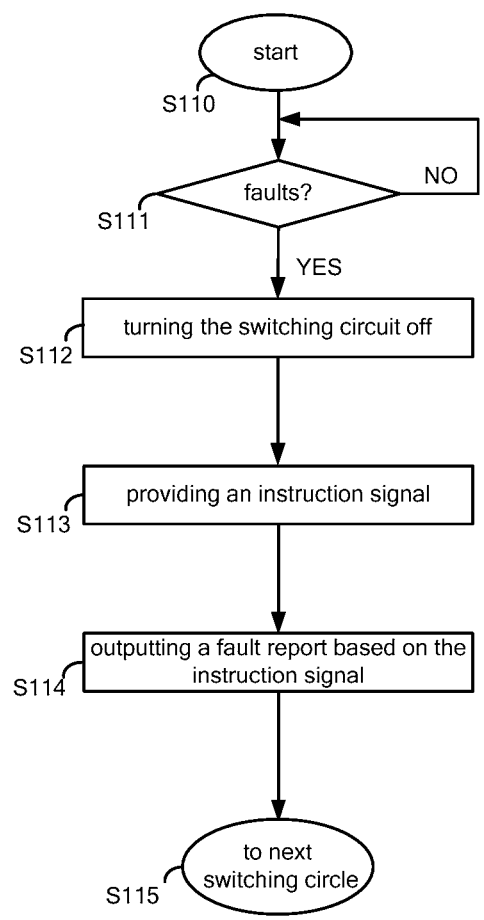
FIG. 11 is a working flow chart of the switching circuit 10 shown in FIG. 2 in accordance with one embodiment of the present invention.

FIG. 11 is a working flow chart of the switching circuit 10 shown in FIG. 2 in accordance with one embodiment of the present invention. The switching circuit 10 comprises a first pin 101 and a second pin 102, and wherein during normal operation (i.e. no fault occurs in the switching circuit), the second pin 102 is configured to receive a control signal PWM to control the switching circuit 10. A fault detection method may comprise steps S110~S119.

At step S110, a cycle is started.

At step S111, detecting whether one or more faults occur in the switching circuit 10. This may be realized by detecting whether each of the plurality of fault state signals (e.g. F_OC, F_OV, F_OT, F_SG . . . ) has a logic low state. If one or more faults occur, go to step S112 and step S113 at the same time, else, continue to step S111.

At step S112, providing a disable signal fault_UN at the first pin 101, wherein the disable signal fault_UN may be configured to turn the switching circuit 10 off once one or more faults occur. This may be realized by detecting whether the disable signal fault_UN is in an active state. If the disable signal fault_UN is in an active state, the control signal PWM has a logic low state to turn the switching circuit 10 off.

At step S113, providing an instruction signal fault_C at the second pin 102 once one or more faults occur, wherein the instruction signal is configured to represent each of the one or more faults with a particular value. In one embodiment, the instruction signal fault_C may comprise a voltage signal. In another embodiment, the instruction signal fault_C may comprise a current signal or other suitable signal.

At step S114, outputting a fault report signal fault_R to instruct the detailed fault information of the switching circuit 10 based on the instruction signal fault_C at the pin 102. This may be realized by a DAC converter.

At step S115, continue to the next switching circle.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A switching circuit used in a voltage converter, the switching circuit comprising:
   a first pin, the switching circuit is configured to output a disable signal through the first pin, wherein the switching circuit is turned off once the disable signal is in an active state, and wherein the disable signal is in the active state when one or more faults occur in the switching circuit; and
   a second pin, when the disable signal is in an inactive state, the switching circuit is configured to receive a control signal through the second pin to control the switching circuit; and when the disable signal is in the active state, the switching circuit is configured to output an instruction signal through the second pin, wherein the instruction signal is configured to represent each of the one or more faults with a particular value.

2. The switching circuit of claim 1, wherein the switching circuit further comprises:
   a switching module coupled to the second pin to receive the control signal, and configured to provide a plurality of fault state signals, wherein the plurality of fault state signals are configured to indicate whether the one or more faults occur in the switching circuit; and
   a fault instruction circuit configured to receive the plurality of fault state signals, wherein the fault instruction circuit is coupled to the first pin to provide the disable signal based on the plurality of fault state signals, and also coupled to the second pin to provide the instruction signal when the disable signal is in the active state.

3. The switching circuit of claim 2, wherein the fault instruction circuit comprises:
   a fault logic circuit having a plurality of input terminals, a first output terminal and a plurality of second output terminals, wherein each of the plurality of input terminals of the fault logic circuit is configured to receive one of the plurality of fault state signals correspondingly, and wherein the first output terminal of the fault logic circuit is coupled to the first pin, and wherein the fault logic circuit is configured to conduct a logic operation of the plurality of fault state signals to provide the disable signal at the first output terminal, and to provide a plurality of switching control signals at the plurality of second output terminals respectively; and
   a fault control circuit having a plurality of input terminals and an output terminal, wherein each of the plurality of input terminals of the fault control circuit is configured to receive one of the plurality of switching control signals, and wherein the output terminal of the fault control circuit is coupled to the second pin, and wherein the fault control circuit is configured to provide the instruction signal at the output terminal of the fault control circuit based on the plurality of switching control signals.

4. The switching circuit of claim 3, wherein the fault control circuit comprises:
   a first plurality of resistor modules connected in parallel between a supply voltage and the second pin; and
   a second plurality of resistor modules connected in parallel between the second pin and a logic ground; and wherein
      each of the first and second pluralities of resistor modules comprises a switch having a control terminal, wherein the control terminal of the switch is configured to receive one of the plurality of switching control signals; and wherein
      the value of the instruction signal varies by controlling the switch of each of the first and second pluralities of resistor modules.

5. The switching converter of claim 4, wherein each of the first and second pluralities of resistor modules further comprises a resistor connected to the switch in series, and wherein the resistor and the switch of each of the first plurality of resistor modules are connected in series between the supply voltage and the second pin, and wherein the resistor and the switch of each of the second plurality of resistor modules are connected in series between the second pin and the logic ground.

6. The switching converter of claim 5, wherein the resistor of at least one of the first and second pluralities of resistor modules has a different resistance value from the remaining resistors of the first and second pluralities of resistor modules.

7. The switching converter of claim 4, wherein at least one of the first and second pluralities of resistor modules further comprises a resistor connected to the switch in series.

8. The switching circuit of claim 4, wherein the instruction signal comprises a voltage signal.

9. The switching circuit of claim 2, wherein the switching module comprises:
   at least one switch, wherein the at least one switch is configured to receive the control signal for converting an input voltage to an output voltage; and
   a plurality of fault detection modules configured to detect whether one or more faults occur in the switching module, wherein each of the plurality of fault detection modules is configured to provide one of the plurality of fault state signals, and wherein each of the plurality of fault state signals is indicative of one fault.

10. The switching circuit of claim 9, wherein one of the plurality of fault detection modules comprises an over current detection circuit, and the one fault comprises an over current fault correspondingly.

11. A multi-phase voltage converter, comprising:
   a plurality of switching circuits with each of the switching circuits comprising:
      a first pin, the switching circuit is configured to output a disable signal through the first pin, wherein the disable signal is in an active state when one or more faults occur in the switching circuit; and
      a second pin, when the disable signal is in an inactive state, the switching circuit is configured to receive a control signal through the second pin to control the switching circuit; and when the disable signal is in the active state, the switching circuit is configured to output an instruction signal through the second pin, wherein the instruction signal is configured to represent each of the one or more faults with a particular value; and
   a controller configured to receive a feedback signal indicative of an output voltage of the multi-phase voltage converter, and further configured to generate the control signal of each of the plurality of switching circuits based on the feedback signal, wherein the controller is also configured to receive the disable signal of each of the plurality of switching circuits; wherein
      when the disable signal of each of the plurality of switching circuits is in the inactive state, the controller is configured to provide the control signal to the second pin of each of the plurality of switching circuits; and wherein
      when the disable signal of one of the plurality of switching circuits is in the active state, the controller is configured to turn the plurality of switching circuits off, and further configured to receive the instruction signal from the second pin of the corresponding switching circuit.

12. The multi-phase switching converter of claim 11, wherein each of the plurality of switching circuits further comprises:
   a switching module coupled to the second pin to receive the control signal, and configured to provide a plurality of fault state signals, wherein the plurality of fault state signals are configured to indicate whether the one or more faults occur in the switching circuit; and
   a fault instruction circuit configured to receive the plurality of fault state signals, wherein the fault instruction circuit is coupled to the first pin to provide the disable signal based on the plurality of fault state signals, and also coupled to the second pin to provide the instruction signal when the disable signal is in the active state.

13. The multi-phase switching converter of claim 12, wherein the fault instruction circuit further comprises:
   a fault logic circuit having a plurality of input terminals, a first output terminal and a plurality of second output terminals, wherein each of the plurality of input terminals of the fault logic circuit is configured to receive one of the plurality of fault state signals correspondingly, and wherein the first output terminal of the fault logic circuit is coupled to the first pin, and wherein the fault logic circuit is configured to conduct a logic operation of the plurality of fault state signals to provide the disable signal at the first output terminal, and to provide a plurality of switching control signals at the plurality of second output terminals respectively; and
   a fault control circuit having a plurality of input terminals and an output terminal, wherein each of the plurality of input terminals of the fault control circuit is configured to receive one of the plurality of switching control signals, and wherein the output terminal of the fault control circuit is coupled to the second pin, and wherein the fault control circuit is configured to provide the instruction signal at the output terminal of the fault control circuit based on the plurality of switching control signals.

14. The multi-phase switching converter of claim 13, wherein the fault control circuit comprises:
   a first plurality of resistor modules connected in parallel between a supply voltage and the second pin; and
   a second plurality of resistor modules connected in parallel between the second pin and a logic ground; and wherein
      each of the first and second pluralities of resistor modules comprises a switch having a control terminal, wherein the control terminal of the switch is configured to receive one of the plurality of switching control signals; and wherein
      the value of the instruction signal varies by controlling the switch of each of the first and second pluralities of resistor modules.

15. The multi-phase switching converter of claim 14, wherein each of the first and second pluralities of resistor modules further comprises a resistor connected to the switch in series, and wherein the resistor and the switch of each of the first plurality of resistor modules are connected in series between the supply voltage and the second pin, and wherein the resistor and the switch of each of the second plurality of resistor modules are connected in series between the second pin and the logic ground.

16. The multi-phase switching converter of claim 14, wherein at least one of the first and second pluralities of resistor modules further comprises a resistor connected to the switch in series.

17. The multi-phase switching converter of claim 11, wherein the controller comprises:
   a sub-controller configured to receive the feedback signal, and further configured to generate the control signal of each of the plurality of switching circuits based on the feedback signal; and
   a fault report circuit configured to receive the disable signal of each of the plurality of switching circuits, wherein when the disable signal of each of the plurality of switching circuits is in the inactive state, the sub-controller is configured to provide the control signal to the second pin of each of the plurality of switching circuits; and wherein when the disable signal of one of the plurality of switching circuits is in the active state, the fault report circuit is configured to turn the plurality of switching circuits off, and further configured to receive the instruction signal from the second pin of the corresponding switching circuit.

18. The multi-phase switching converter of claim 17, wherein the controller further comprises:

a plurality of first switches, each of the plurality of first switches is coupled between the sub-controller and the second pin of one of the plurality of switching circuits; and a plurality of second switches, each of the plurality of second switches is coupled between the fault report circuit and the second pin of one of the plurality of switching circuits; and wherein when the disable signal of one of the plurality of switching circuits is in the active state, each of the plurality of first switches is turned off, and the corresponding second switch is turned on.

19. The multi-phase switching converter of claim 17, wherein the fault report circuit comprises a digital-to-analog converter.

20. A fault detection method used in a switching circuit, wherein the switching circuit has a first pin and a second pin, and wherein during normal operation, the switching circuit is configured to receive a control signal through the second pin to control the switching circuit; the fault detection method comprising:

detecting whether one or more faults occur in the switching circuit;

providing a disable signal at the first pin by the switching circuit, wherein the disable signal is configured to turn the switching circuit off once one or more faults occur;

providing an instruction signal at the second pin by the switching circuit once one or more faults occur, wherein the instruction signal is configured to represent each of the one or more faults with a particular value; and outputting a fault report signal based on the instruction signal.

* * * * *